United States Patent

Galloway

(10) Patent No.: US 6,271,636 B1
(45) Date of Patent: Aug. 7, 2001

(54) SERVO CONTROL SYSTEM AND METHOD FOR A DATA STORAGE DEVICE WITH IMPROVED BRAKING

(75) Inventor: Paul A. Galloway, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/394,610

(22) Filed: Sep. 13, 1999

Related U.S. Application Data

(60) Provisional application No. 60/100,139, filed on Sep. 14, 1998.

(51) Int. Cl.[7] .................................................. G11B 5/596
(52) U.S. Cl. ....................... 318/127; 318/122; 360/78.01; 360/78.04; 360/78.13
(58) Field of Search ............................... 318/34, 560, 567, 318/569, 591, 592, 600, 626, 122, 127; 388/907.2, 907.5; 360/73.05, 77.05, 77.02, 77.08, 78.04, 78.05, 78.06, 78.07, 78.11, 78.13, 78.14

(56) References Cited

U.S. PATENT DOCUMENTS

| 5,084,640 | 1/1992 | Morris et al. ........................... 310/13 |
| 5,206,555 | 4/1993 | Morris et al. ........................... 310/105 |
| 5,295,026 | * 3/1994 | Chishima ........................... 360/77.08 |
| 5,384,524 | 1/1995 | Romano ............................... 318/569 |
| 5,566,148 | * 10/1996 | Takahara et al. ........................ 369/32 |
| 5,646,797 | * 7/1997 | Kadlec et al. ........................... 360/75 |
| 5,914,829 | 6/1999 | Kadlec et al. .................... 360/78.04 |
| 5,923,491 | 7/1999 | Kisaka et al. ..................... 360/77.04 |
| 6,115,205 | * 9/2000 | Waugh et al. ..................... 360/78.06 |

FOREIGN PATENT DOCUMENTS 0 456 371 A2  11/1991  (EP) .

* cited by examiner

*Primary Examiner*—Elvin Enad
*Assistant Examiner*—Judson H. Jones
(74) *Attorney, Agent, or Firm*—Westman, Champlin & Kelly, P.A.

(57) ABSTRACT

A servo control system for a voice coil motor including a servo controller using position feedback to provide an acceleration current to the voice coil motor and voice coil brake providing a deceleration current based upon velocity feedback from the voice coil motor. In one embodiment, the velocity of the voice coil motor is derived from current feedback. A method for braking an actuator driven by a voice coil motor including the steps or receiving and processing current feedback from the voice coil motor and supplying a deceleration current to the voice coil motor derived from the current feedback from the voice coil motor.

13 Claims, 9 Drawing Sheets

SERVO CONTROL SYSTEM AND METHOD FOR A DATA STORAGE DEVICE WITH IMPROVED BRAKING

CROSS-REFERENCE TO RELATED APPLICATION

The present application claims priority to Provisional Application Ser. No. 60/100,139 filed Sep. 14, 1998 and entitled "IMPROVED DISK DRIVE VOICE COIL MOTOR BRAKE".

FIELD OF THE INVENTION

The present invention relates to a data storage device. In particular, the present invention relates to a brake assembly for a voice coil motor for positioning heads for read and write operations.

BACKGROUND OF THE INVENTION

Disc drives are used to store digitally encoded information. Digital information is stored on rigid discs supported for rotation for read and write operations. Heads including transducer elements are supported relative to the disc surface to read data from and write data to the disc surface. An E-block movably supports heads relative to the disc surface to read data from concentric data tracks on the disc. A voice coil motor moves E-block to position heads relative to selected data tracks on the disc surface.

The movement of the head to a desired data track is referred to as seeking. Maintaining the head over the center of the desired data track during read and write operations is referred to as track "following". Operation of the E-block (and heads) is controlled by a servo control system using prerecorded servo information or position feedback either on a dedicated servo disc or on sectors interspersed among the data on a data disc. Loss of position feedback interferes with servo control and can cause the E-block and head to contact or slam into an end stop. Rapid movement or acceleration of the E-block into the end stop can damage heads and degrade air bearing stiffness.

In prior servo control systems, the E-block is slowed when there is a loss of position feedback to reduce the force at which the E-block slams into the end stop. To slow the E-block, the voltage potential across the voice coil motor is electrically shorted and the back Electro-motive force (Emf) is used to supply a brake current to slow the E-block. Although, the back Emf slows the E-block to reduce the force at which the E-block contacts the end stop, the lag time for the back Emf to stop the E-block can be relatively long in comparison to the operating stroke of the E-block. A relatively long lag time increases the stopping time and force at which the E-block contacts the end stop. The present invention addresses these and other problems, and offers other advantages over the prior art.

SUMMARY OF THE INVENTION

The present invention relates to a servo control system including servo position feedback to energize the voice coil motor and a voice coil brake providing a deceleration current. The deceleration current $i_b$ is proportional to the velocity of the voice coil motor. In one embodiment, the velocity of the voice coil motor is derived from current feedback.

DETAILED DESCRIPTION OF THE PREFERRED EMBODIMENTS

Figure 1:
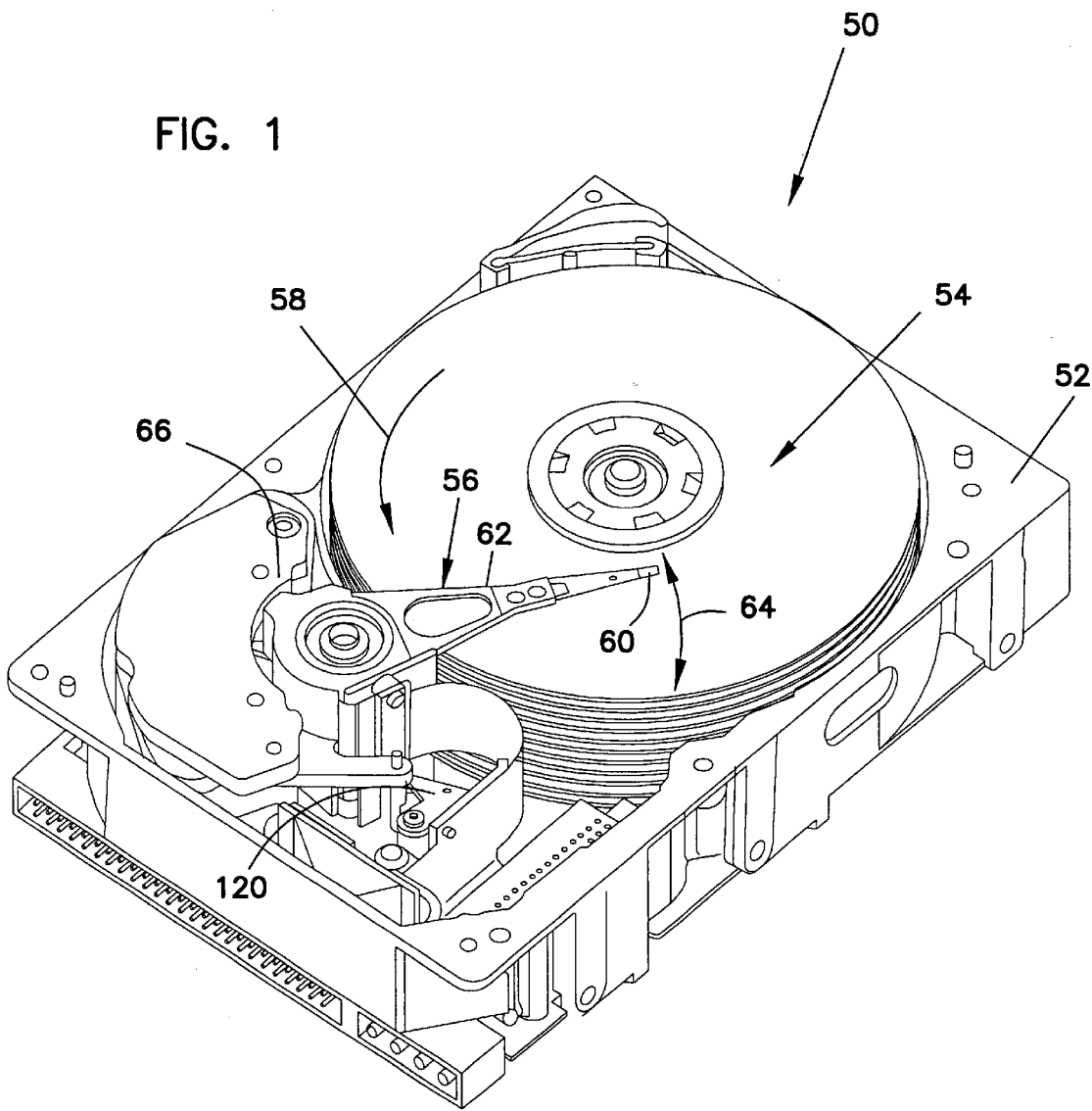
FIG. 1 is a perspective view of a data storage device.

The present invention relates to a voice coil motor brake for braking an actuator or E-block of a data storage system supporting data heads for read-write operations. The present invention has application for a rotary-type magnetic disc drive, as illustrated in FIG. 1. As illustrated, disc drive 50 includes deck 52, discs 54, and E-block 56. Discs 54 are rotationally coupled to deck 52 via a spindle motor (not shown) for rotation, as illustrated by arrow 58. E-block 56 is rotationally coupled to deck 52 to supports heads 60 for reading and writing data to and from selected data tracks of discs 54. Heads 60 are supported by a plurality of actuator arms 62 on E-block 56 (only one shown in FIG. 1) and the E-block 56 rotates as illustrated by arrow 64 to move heads 60 along an arcuate path for seek operations via operation of a voice coil motor ("VCM") 66.

Figure 2:
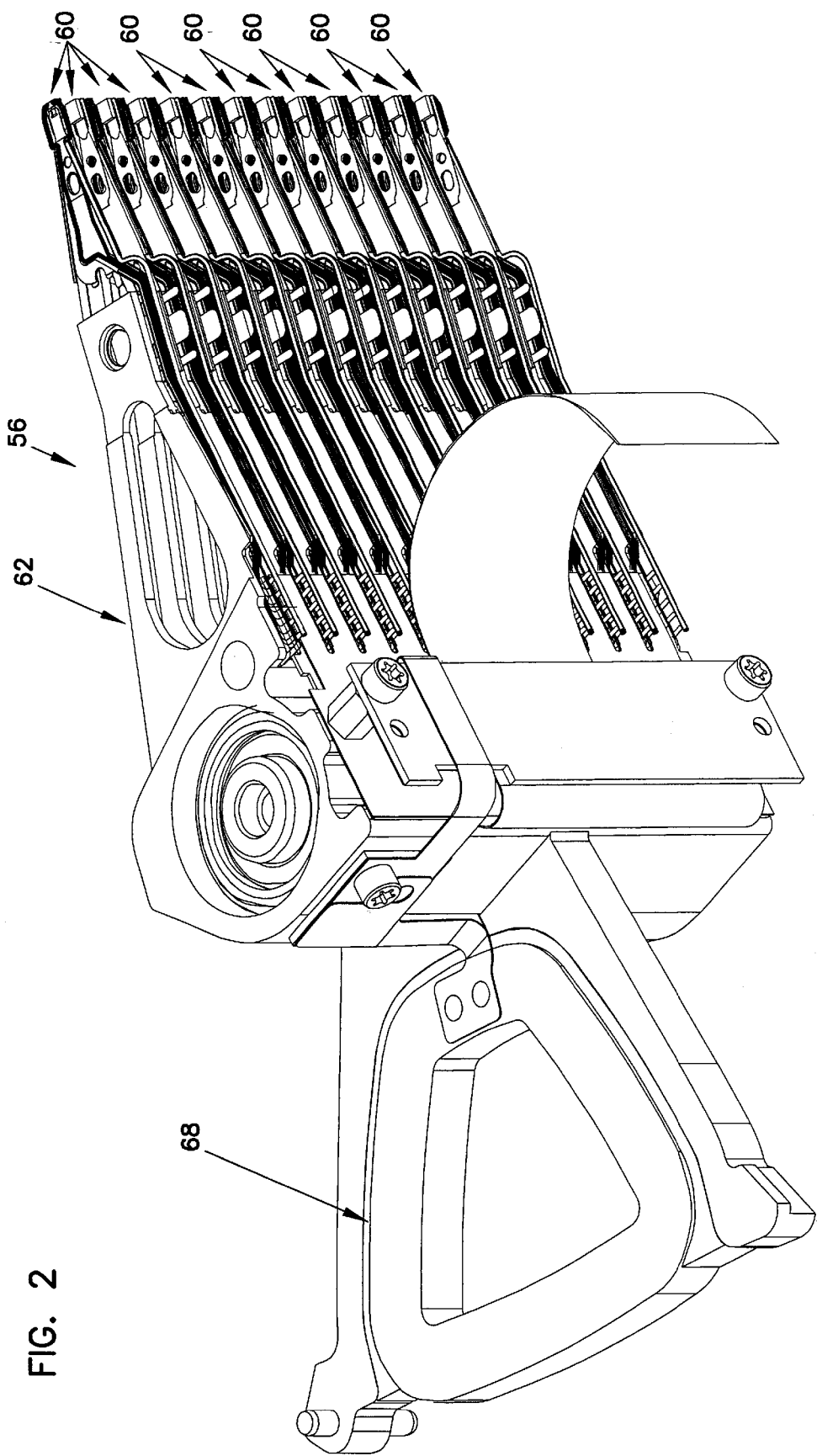
FIG. 2 is a perspective view of an actuator or E-block and voice coil of a data storage device.
Figure 3:
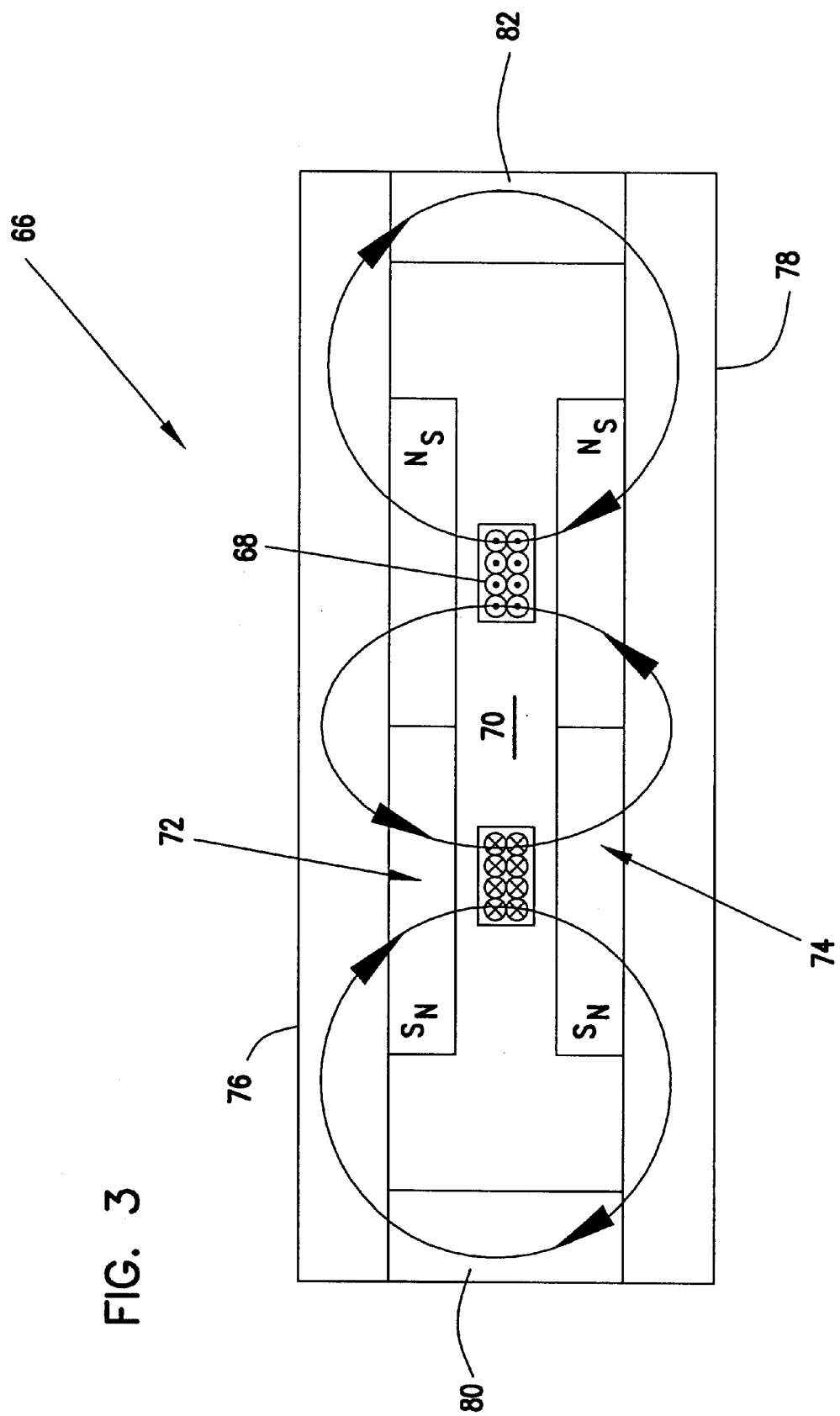
FIG. 3 illustrates operation of a voice coil motor for moving E-block for head placement for read and write operations.

As shown in FIG. 2, E-block 56 includes a wound coil 68 which is supported in a permanent magnetic field 70 formed in a gap between upper and lower magnets 72, 74 supported by upper and lower backirons 76, 78 separated by spaces 80, 82 as illustrated in FIG. 3. Current is supplied through coil 68 in one direction to rotate E-block in a first direction and is supplied in a second direction to rotate E-block 56 in the opposite direction. Although a particular magnet and back-iron assembly is shown, the invention is not limited to the particular embodiment shown and other constructions may be used as is known in the art.

A permanent magnetic field is produced by the magnets 72, 74. Current is supplied to coil 68 aligned in the flux path of the magnetic field to generate a force based upon:

$$F = il n \times B \qquad \text{Eq. 1}$$

where:
F—is the force generated;
i—is the current through the coil;

l—is the length of the active coil legs;
B—is the magnetic field; and
n—is the number of turns in the coil.

Thus current is supplied through coil 68 to generate a force to accelerate the E-block 56 for seek operations. The velocity of E-block 56 is proportional to the current supplied to the coil 68 as follows:

$$V_m = K \int i \, dt \qquad \text{Eq. 2}$$

$V_m$—is the velocity of the E-block;
i—is the current supplied to the coil; and
K—is a constant proportional to the length of the active coil legs, the magnetic field, and the number of turns in the coil.

Figure 4:
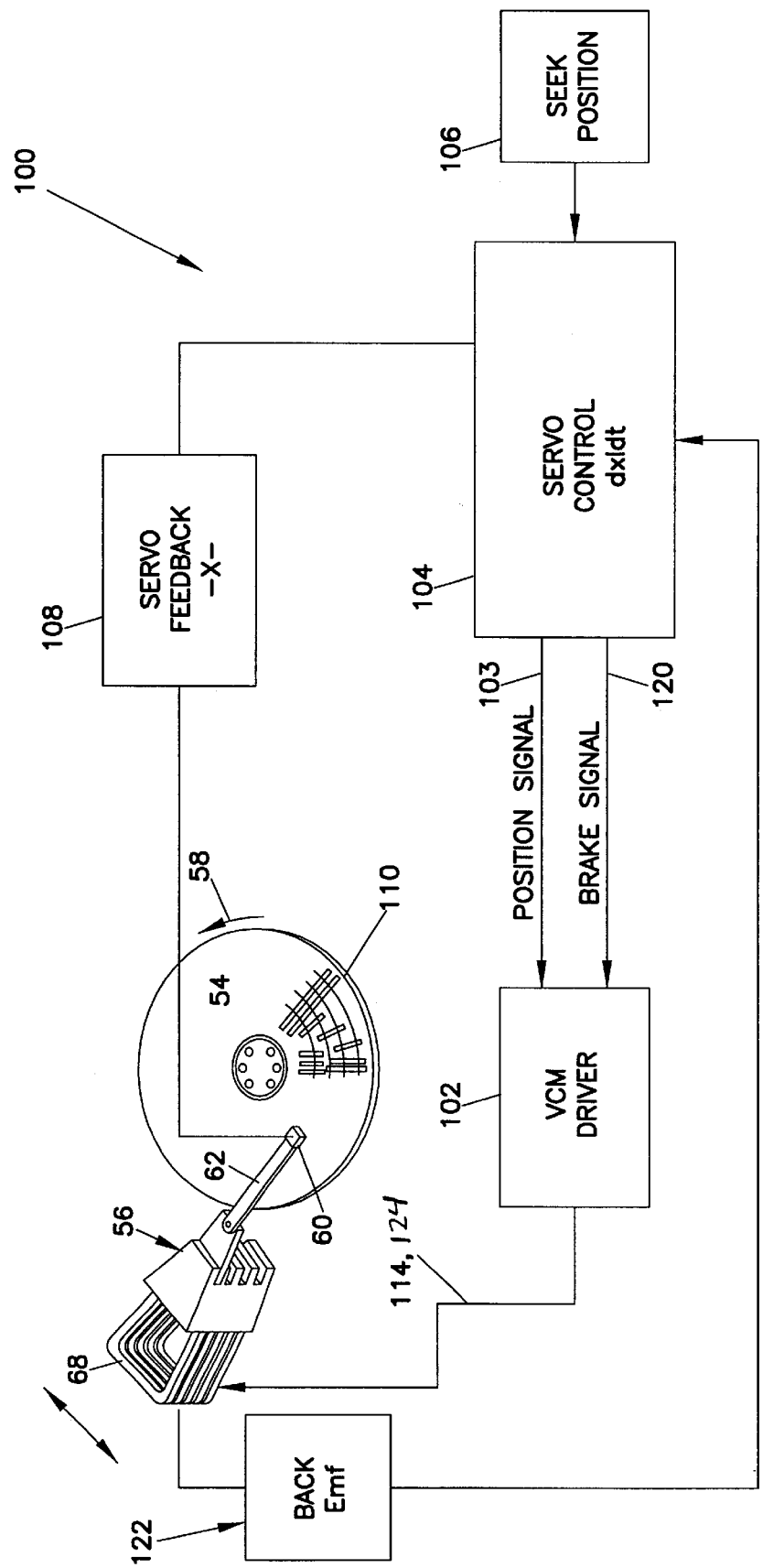
FIG. 4 is a schematic illustration of a servo control system and a prior art voice coil motor brake.

A servo control system 100 (shown schematically in FIG. 4) operates VCM 66 to move heads 60 from one track to another based upon servo information and maintain the heads 60 in radial alignment with a selected track. For seek and follow operations, a voice coil motor driver 102 supplies current to the voice coil 68 based upon a position signal 103 generated by the servo controller 104. The position signal 103 is generated based upon a seek position 106 and servo feedback 108. In the embodiment shown servo feedback 108 provides position feedback from servo information 110 interspersed in a data disc as illustrated in FIG. 4. Alteratively, position feedback can be provided from a dedicated servo disc.

Figure 5:
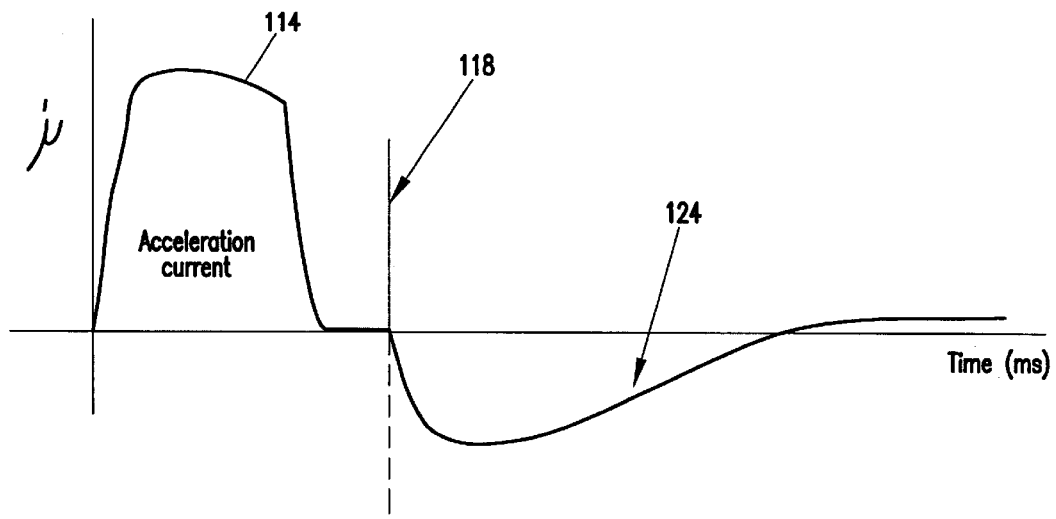
FIG. 5 graphically illustrates a voice coil motor brake of the prior art.
Figure 6:
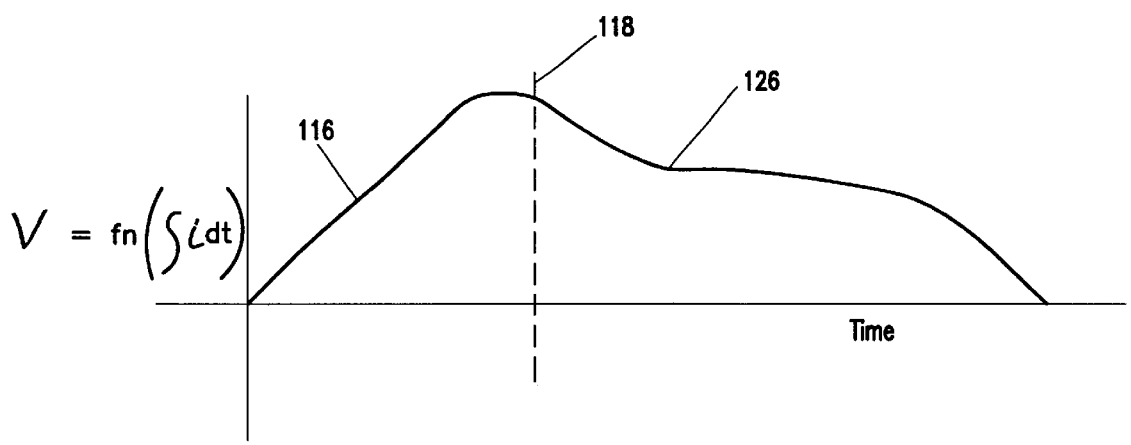
FIG. 6 is a graphical illustration of the braking velocity of the voice coil motor brake of FIG. 5.

As illustrated in FIGS. 4–6, voice coil motor drive 102 supplies an acceleration current 114, the magnitude and direction of which is based upon the seek position 106 and servo feedback 108. The acceleration current 114 operates the VCM 66 to move the E-block 56. As shown in FIG. 6, the velocity of E-block is proportional to the integral of the acceleration current 114 (or $\int i_a$) as shown by line 116. During a seek operation, servo feedback can be interrupted or lost (due to a bad disc sector or head instability) as illustrated schematically by line 118 in FIGS. 5–6. The loss of servo feedback data 108 can result in loss of control of the E-block 56 resulting in the E-block contacting or slamming into an end stop 119 (as illustrated in FIG. 1) which is referred to as a crash stop. A crash stop can damage the head and can degrade the air bearing stiffness of a slider (not separately shown) of the head. The loss servo data 110 can result in the loss of velocity as well as position feedback 108 for E-block 56 control.

In prior devices upon the loss of servo feedback 108, the servo controller 104 supplies a brake signal 120 to operate a voice coil motor brake. To brake the voice coil motor, current in the coil 68 was shorted and the back Emf 122 (shown schematically in FIG. 4) of the system was used to drive a brake current 124 to slow the E-block 56 to reduce impact at the end stop 119, as illustrated in FIGS. 4–5. Back Emf 122 is proportional to the velocity of the E-block so the higher the velocity of the E-block 56, the higher the back Emf 122 and brake current 124. The brake current 124 slowed the velocity of the E-block 56 as illustrated by line 126 in FIG. 6.

Figure 7:
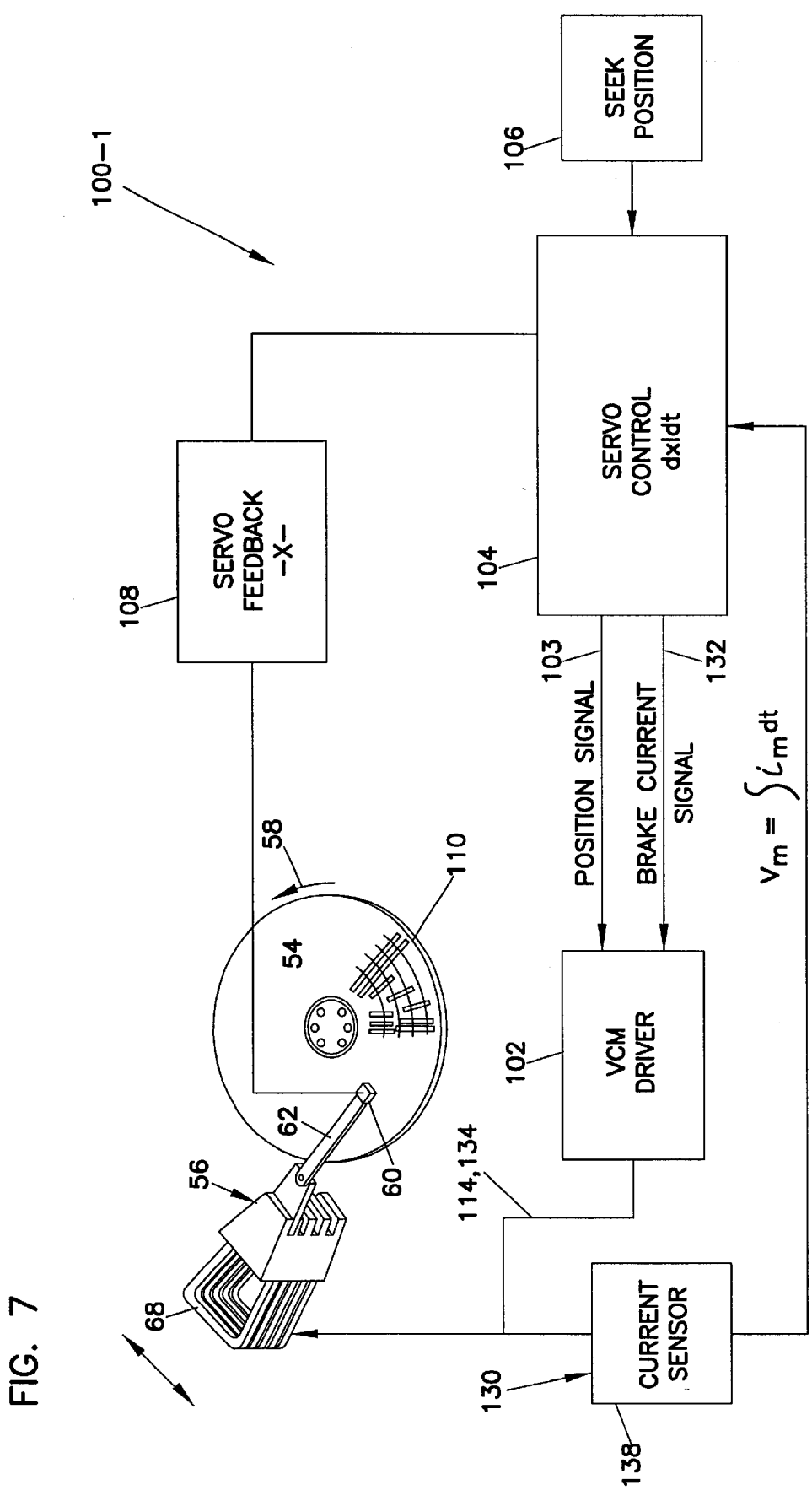
FIG. 7 is a schematic illustration of a servo control system including an embodiment of a voice coil motor brake of the present invention.
Figure 8:
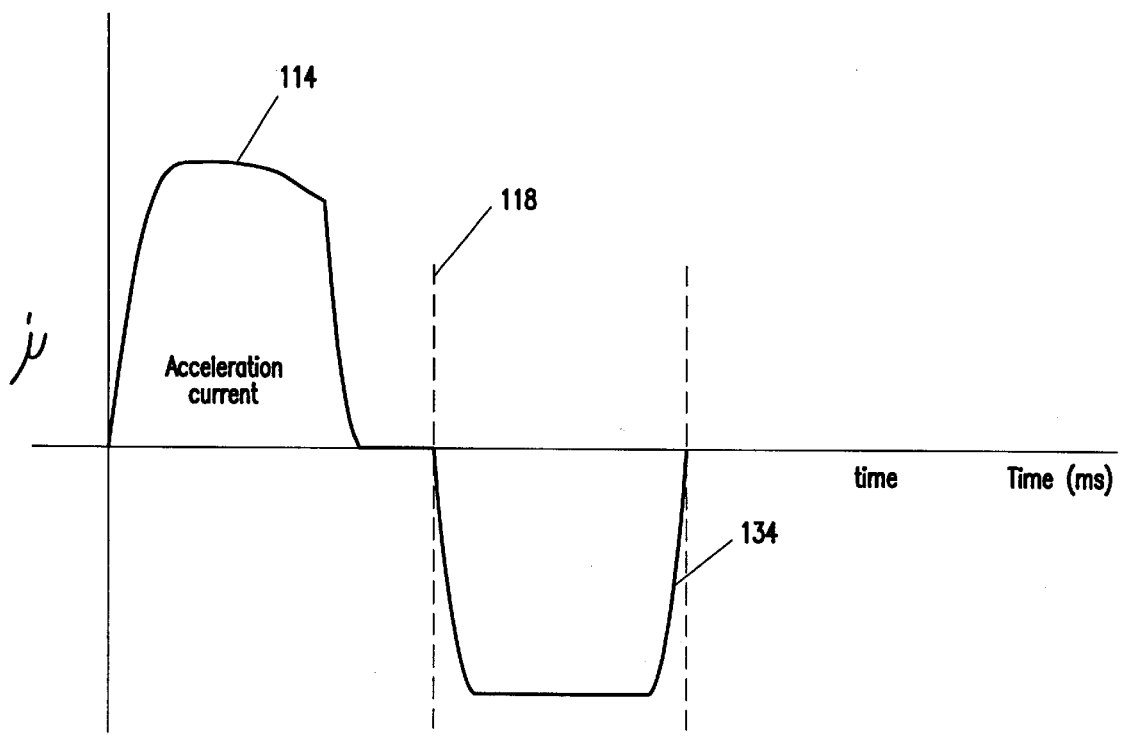
FIG. 8 graphically illustrates a voice coil motor brake of the present invention supplying a deceleration current to brake the voice coil motor.
Figure 9:
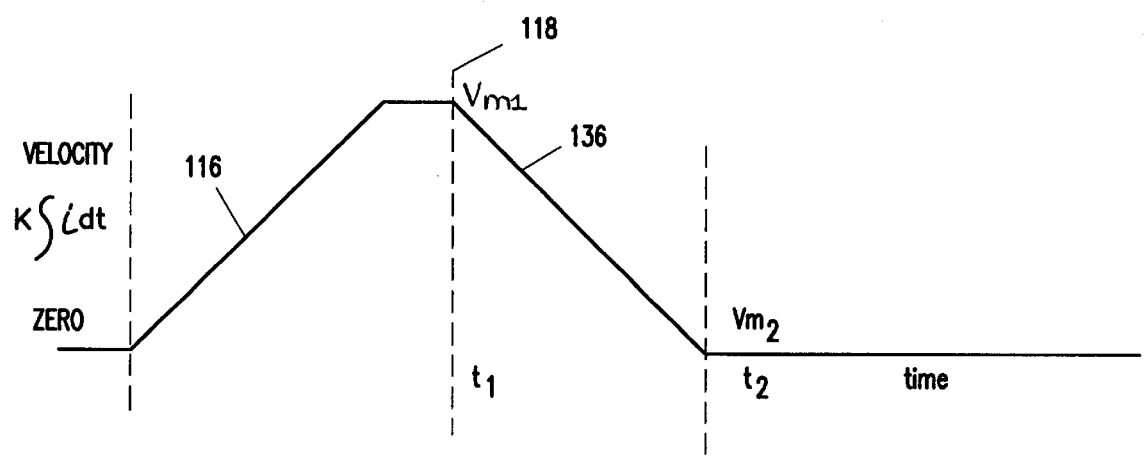
FIG. 9 is a graphical illustration of the velocity of the voice coil motor brake of FIG. 7.

The present invention relates to a voice coil motor brake which provides improved dynamic response to reduce crash impact of the E-block 56 upon servo feedback loss. An embodiment of the voice coil motor brake is shown in FIGS. 7–9 where like numbers are used to refer to like elements in the previous figures. As shown in FIGS. 7–9, the servo control system 100-1 includes velocity feedback $V_m$ 130 for the moving coil 68. The servo controller 104 processes the velocity feedback $V_m$ 130 to supply an opposing force proportional to the velocity of the moving coil 68 of the E-block 56 to stop the VCM 66 to reduce the impact of a crash stop.

As shown in FIGS. 7–9, the servo controller 104 processes the velocity feedback 130 to provide a brake current signal 132 to the VCM driver 102 to supply a deceleration or current $i_b$ 134 to coil 68 in the opposite direction of the acceleration current 114 so that the velocity 136 of the E-block 56 is slowed to zero to limit contact force between the E-block 56 and the end stop 119. The magnitude and duration of the deceleration current $i_b$ 134 is derived from $$V_{m1} - V_{m2} = K \int i_b \, dt \qquad \text{Eq. 3}$$

where:
$V_{m1}$—is the voice coil motor velocity at servo feedback loss 118
$V_{m2}$—is the braked velocity of the voice coil motor (e.g. near zero velocity)
$i_b$—is the brake or deceleration current 134

In the embodiment shown in FIGS. 7–9, the velocity $V_m$ feedback 130 from the VCM 66 is provided by a current sensor 138 to measure feedback current $i_m$ from the voice coil 68. The feedback current $i_m$ is proportional to the velocity of the voice coil motor as follow:

$$V_m = K \int i_m \, dt$$

The feedback current $i_m$ from the voice coil motor is used to derive a deceleration current $i_b$ having a sufficient magnitude and duration to slow the velocity feedback $V_m$ 130 from the voice coil motor to zero. The duration of the deceleration current $i_b$ is determined based upon the magnitude of the deceleration current $i_b$ and the monitored integral of current $i_m$ of the motor. When the integral of current $i_m$ of the motor drops to or near zero, the brake or deceleration current $i_b$ drops to zero and the VCM 66 and E-block 56 should be close to zero velocity.

Figure 10:
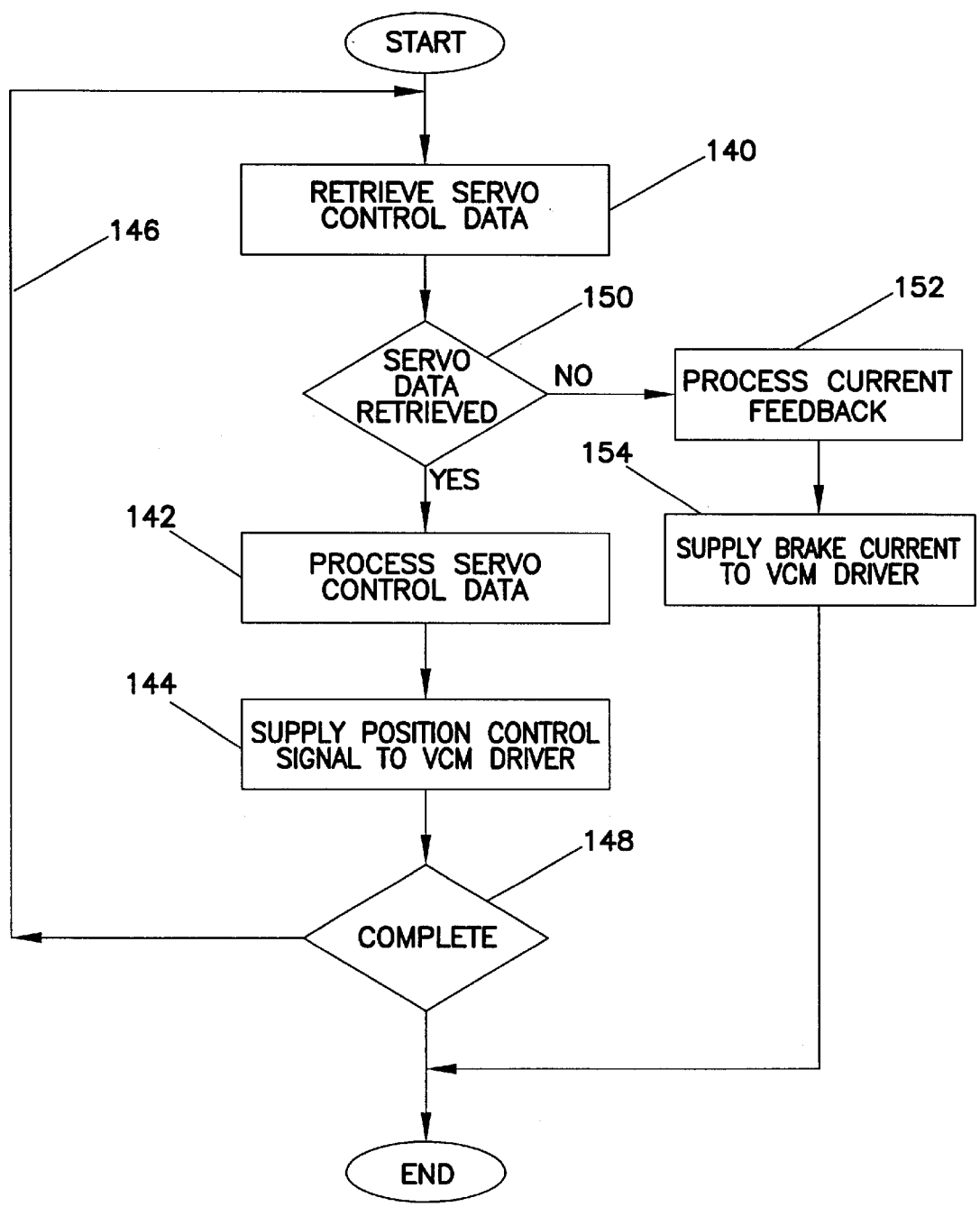
FIG. 10 is a flow chart illustrating operation of an embodiment of a servo control system and voice coil motor brake of the present invention.
Figure 11:
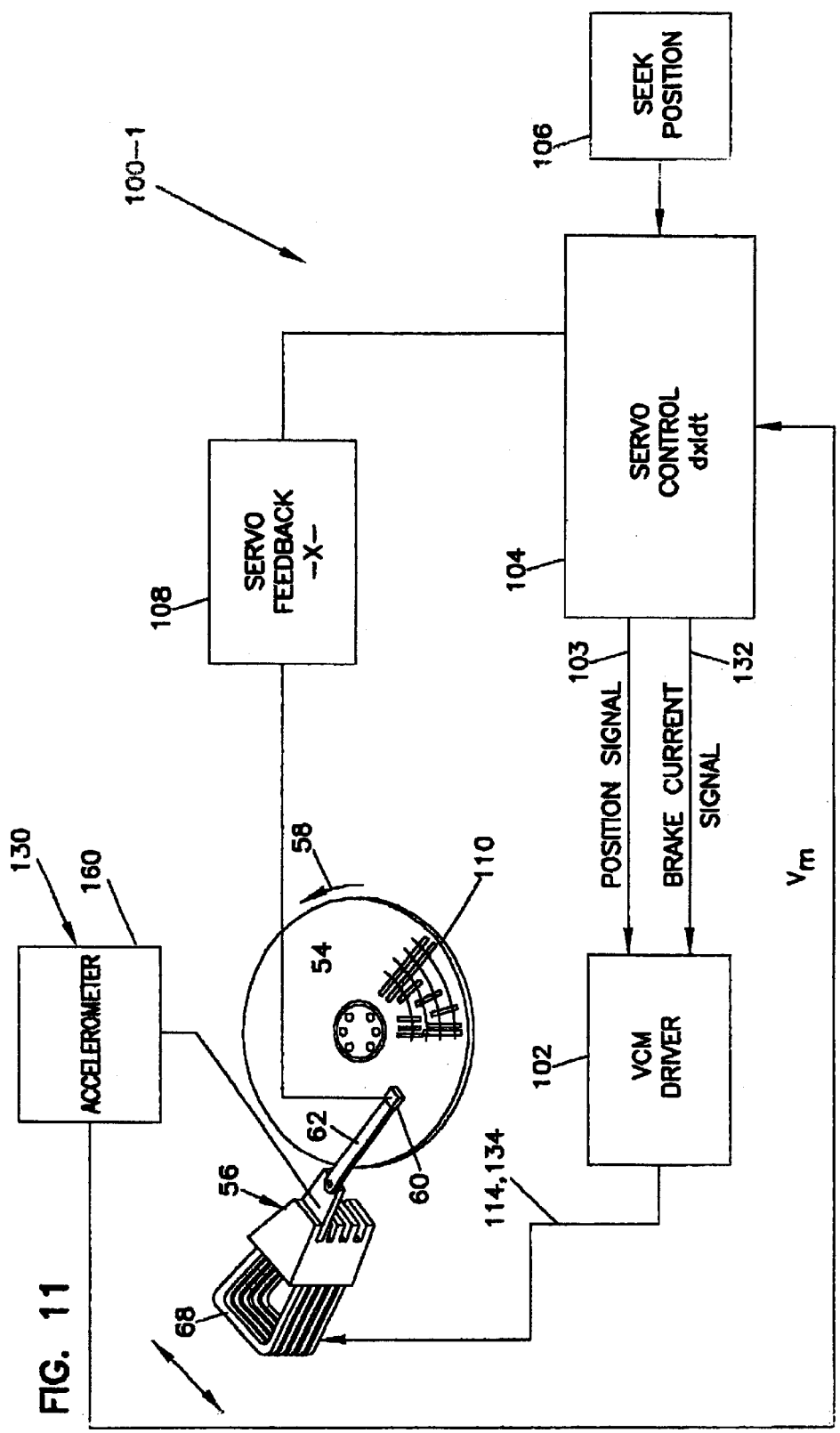
FIG. 11 is a schematic illustration of an alternate embodiment of a voice coil motor brake of the present invention.

Thus, as shown in FIG. 10, heads 60 read servo feedback 108 from discs as illustrated by block 140. Servo feedback is processed as illustrated by block 142 to supply a position control signal 103 for head placement as illustrated by block 144. Servo control continues as illustrated by line 146 until operation is complete as illustrated by block 148. If servo data is interrupted or lost, as illustrated by line 150, velocity feedback $v_m$ 130 from the voice coil motor is processed, as illustrated by block 152, to supply a deceleration or brake current 134 as illustrated by block 154 to brake the E-block 56 to limit impact of a crash stop. Velocity feedback $v_m$ is derived from a current sensor 130 coupled to the VCM 66. Alternatively, velocity feedback $v_m$ can be derived from an accelerometer 160 coupled to the E-block 56 as shown in FIG. 11 and application of the invention is not limited to the specific embodiments shown.

Thus, as described, the present invention relates to a servo control system 100-1 for a voice coil motor 66 including a brake. The servo controller 104 supply a brake or deceleration current signal 132 to the VCM driver 102 based upon velocity feedback $V_m$ of the VCM 66 to slow the VCM 66 upon the loss of servo feedback 108. The magnitude and duration of the brake deceleration current 134 $i_b$ is based upon $v_m = K \int i_b \, dt$ It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic disc drive system, it will be appreciated by those skilled in the art that the teachings of the present invention can be applied to other systems, like an optical disc drive system, without departing from the scope and spirit of the present invention.

What is claimed is:

1. A servo control system for a voice coil motor comprising:
    servo feedback including head position feedback and current feedback from the voice coil motor; and
    a servo controller connected to receive and process the head position feedback to provide an acceleration current to the voice coil motor and to provide a deceleration current $i_b$ opposed to the direction of the acceleration current, based upon an integral of the current feedback from the voice coil motor.

2. The servo control system of claim 1 wherein the deceleration current $i_b$ is derived from the current feedback $i_m$ from the voice coil motor based upon $K\int i_b dt = K\int i_m dt$, where K is a constant.

3. The servo control system of claim 1 wherein the servo controller supplies the deceleration current to the voice coil motor to brake an E-block driven by the voice coil motor upon interruption or loss of the head position feedback.

4. The servo control system of claim 1 wherein the voice coil motor is coupled to an E-block supporting a plurality of heads.

5. A servo control system for a voice coil motor comprising:
    a servo controller for operating the voice coil motor for head placement; and
    means for braking the voice coil motor responsive to a loss of the head position feedback.

6. The servo control system of claim 5 wherein the means for braking includes a current sensor coupled to the voice coil motor to provide current feedback for braking the voice coil motor.

7. The servo control system of claim 5 wherein the means for braking the voice coil motor includes velocity feedback from the voice coil motor $v_m$ and the servo controller derives a deceleration current $i_b$ from the velocity feedback $v_m$ based upon $v_m = K\int i_b \, dt$, where K is a constant.

8. A servo control system for a voice coil motor comprising:
    servo feedback including head position feedback from the voice coil motor; and
    a servo controller connected to receive and process the head position feedback to provide an acceleration current to the voice coil motor and connected to receive and process velocity feedback $v_m$ from an accelerometer coupled to an actuator block driven by the voice coil motor to provide a deceleration current $i_b$ to the voice coil motor opposed to the direction of the acceleration current derived from the velocity feedback $v_m$ from the accelerometer coupled to the actuator block driven by the voice coil motor.

9. The servo control system of claim 8 wherein the deceleration current $i_b$ is derived from the velocity feedback $v_m$ based upon $v_m = K\int i_b dt$, where K is a constant.

10. The method of claim 9 wherein the deceleration current $i_b$ is derived from the current feedback $i_m$ based upon $K\int i_m dt = K\int i_b dt$, where K is a constant.

11. A method for operating a voice coil motor comprising steps of:
    a) providing an acceleration current to the voice coil motor to operate the voice coil motor for head placement;
    b) providing current feedback $i_m$ from the voice coil motor;
    c) processing the current feedback $i_m$ to derive a deceleration current $i_b$; and
    d) applying the deceleration current $i_b$ to the voice coil motor to brake the voice coil motor.

12. The method of claim 11 further comprising steps of:
    e) providing a servo position feedback; and
    f) determining the acceleration current based upon a seek position and the servo position feedback.

13. The method of claim 11 wherein the deceleration current is applied upon loss or interruption of servo feedback.

* * * * *